US009386628B2

(12) United States Patent
Oerton et al.

(10) Patent No.: US 9,386,628 B2
(45) Date of Patent: Jul. 5, 2016

(54) CONVERSION OF MOBILE DEVICE TO LAN-ONLY TELEPHONY FUNCTIONS

(71) Applicant: BLACKBERRY LIMITED, Waterloo (CA)

(72) Inventors: Kevin John Oerton, Waterloo (CA); Brian Alexander Oliver, Fergus (CA)

(73) Assignee: BlackBerry Limited, Waterloo (CA)

(*) Notice: Subject to any disclaimer, the term of this patent is extended or adjusted under 35 U.S.C. 154(b) by 272 days.

(21) Appl. No.: 13/945,417

(22) Filed: Jul. 18, 2013

(65) Prior Publication Data
US 2013/0303236 A1    Nov. 14, 2013

Related U.S. Application Data

(63) Continuation of application No. 12/843,525, filed on Jul. 26, 2010, now Pat. No. 8,509,186.

(60) Provisional application No. 61/328,097, filed on Apr. 26, 2010.

(51) Int. Cl.
H04W 88/06    (2009.01)
H04M 1/253    (2006.01)
(Continued)

(52) U.S. Cl.
CPC ............ *H04W 88/06* (2013.01); *H04M 1/2535* (2013.01); *H04M 1/72519* (2013.01);
(Continued)

(58) Field of Classification Search
CPC ............... H04M 1/72519; H04M 1/72522; H04M 1/2535; H04M 2250/06; H04M 2250/66; H04W 88/06; H04W 36/16; H04W 36/24; H04W 84/04; H04W 84/10; G06F 3/04817; G06F 3/048
See application file for complete search history.

(56) References Cited

U.S. PATENT DOCUMENTS 7,606,190 B2    10/2009    Markovic et al.
8,244,215 B1 *   8/2012    Delaet ............... G06Q 30/0207
                                              455/408
(Continued)

FOREIGN PATENT DOCUMENTS

EP    2018014 A1    1/2009
WO    2008058360 A1    5/2008

OTHER PUBLICATIONS

Private Mobile Networks Ltd, "Fixed Mobile Integration: Realising the potential of Private GSM Networks", White Paper, 2006, pp. 1-13, retrieved from http://www.teleware.com/PDF/PMN-FMI_wp060903.pdf, accessed Apr. 27, 2010.

(Continued)

Primary Examiner — Paul H Masur
(74) Attorney, Agent, or Firm — Rowand LLP

(57) ABSTRACT

A system and method implemented at a communication device for providing access to telephony services over one or more of a number of communication networks, including cellular networks and IP-based fixed and wireless networks. A mobile device may be configurable for voice communication over both a cellular network and a LAN (e.g. a wireless LAN), and may be adapted to place and receive calls via a PBX over one of the cellular network and the LAN. When it is determined that the mobile device is configured for voice communication using one or both of the cellular network connection and the LAN connection, the mobile device may automatically adapt its user interface to reflect the availability of voice communication only over those connections that are available.

14 Claims, 10 Drawing Sheets

(51) Int. Cl.
  *H04M 1/725* (2006.01)
  *H04W 36/16* (2009.01)
  *G06F 3/0481* (2013.01)
  *H04W 36/24* (2009.01)
  *H04W 84/04* (2009.01)
  *H04W 84/10* (2009.01)

(52) U.S. Cl.
  CPC .......... *H04M1/72522* (2013.01); *H04W 36/16* (2013.01); *G06F 3/04817* (2013.01); *H04M 2250/06* (2013.01); *H04M 2250/66* (2013.01); *H04W 36/24* (2013.01); *H04W 84/04* (2013.01); *H04W 84/10* (2013.01)

(56) References Cited

U.S. PATENT DOCUMENTS

| | | | |
|---|---|---|---|
| 2002/0132638 | A1 | 9/2002 | Plahte et al. |
| 2004/0087307 | A1 | 5/2004 | Ibe et al. |
| 2004/0204133 | A1* | 10/2004 | Andrew et al. ............... 455/566 |
| 2004/0266426 | A1 | 12/2004 | Marsh et al. |
| 2005/0170854 | A1 | 8/2005 | Benco et al. |
| 2005/0190747 | A1 | 9/2005 | Sindhwani et al. |
| 2006/0121916 | A1 | 6/2006 | Aborn et al. |
| 2006/0159109 | A1 | 7/2006 | Lamkin et al. |
| 2007/0070948 | A1* | 3/2007 | Kezys et al. ................. 370/331 |
| 2007/0129103 | A1 | 6/2007 | Al-Shaikh |
| 2007/0206569 | A1 | 9/2007 | Silver et al. |
| 2007/0206580 | A1 | 9/2007 | Silver et al. |
| 2007/0268858 | A1 | 11/2007 | Soto |
| 2007/0281682 | A1 | 12/2007 | Raju et al. |
| 2008/0113665 | A1* | 5/2008 | Paas et al. ................. 455/426.1 |
| 2008/0113683 | A1* | 5/2008 | Paas et al. ................. 455/552.1 |
| 2008/0130554 | A1 | 6/2008 | Gisby et al. |
| 2008/0146209 | A1* | 6/2008 | Gass et al. ................... 455/416 |
| 2008/0242356 | A1* | 10/2008 | Marui ............... H04M 1/72583 455/566 |
| 2008/0273489 | A1* | 11/2008 | Adams ......................... 370/329 |
| 2009/0113460 | A1 | 4/2009 | Parrish et al. |
| 2009/0163195 | A1* | 6/2009 | Kim et al. .................. 455/422.1 |
| 2009/0221323 | A1* | 9/2009 | Yach ................. H04M 1/72583 455/552.1 |
| 2009/0227242 | A1* | 9/2009 | Lee ................... H04M 1/27455 455/418 |
| 2009/0258668 | A1 | 10/2009 | Kumar et al. |
| 2009/0279683 | A1 | 11/2009 | Gisby et al. |
| 2010/0009674 | A1 | 1/2010 | Sapkota et al. |
| 2010/0099393 | A1* | 4/2010 | Brisebois et al. ............. 455/418 |

OTHER PUBLICATIONS

Image of GUI on iPhone showing options for calling, published at least as early as Nov. 8, 2010, pp. 1, http://cdn.content.compendiumblog.com/uploads/user/19dc41fd-9692-444d-81ee-e9a49e34471a/88f333a7-94e6-4fe8-8257-e2655134a168/Image/5a79a047453726ec5bf8a6628f37d112.jpg, accessed Nov. 8, 2010.

DiVitas Networks, DiVitas Mobile Unified Communications datasheet, 2010, pp. 1-6, http://www.divitas.com/pdfs/DiVitas_Mobile_UC_Datasheet.pdf, accessed Apr. 27, 2010.

D2 Technologies, Inc., mCUE mobile convergence software solution, 2007, pp. 1-3, http://www.d2tech.com/1-products/mcue.htm, accessed Nov. 8, 2010.

OnRelay, Inc., "Unified MBX Product Sheet", 2010, pp. 1-2, retrieved from http://www.onrelay.com/index.php?id=199 (download link on this page), accessed Apr. 27, 2010.

Apple: "iPhone 3G user manual", Jul. 11, 2008, pp. 1-154, XP007907619, retrieved from the Internet (http://manuals.info.apple.com/en_US/iPhone_User_Guide.pdf).

Biggs, J.: "Skype for iPhone officially official [Update]", Internet Citation, Mar. 30, 2009, p. 1, XP007915606, retrieved from the Internet on Nov. 4, 2010 (http://www.crunchgear.com/2009/03/30/skype-for-iphone-officially-official).

Extended European Search Report dated Nov. 11, 2010 from EP10170746.1, pp. 1-9.

\* cited by examiner

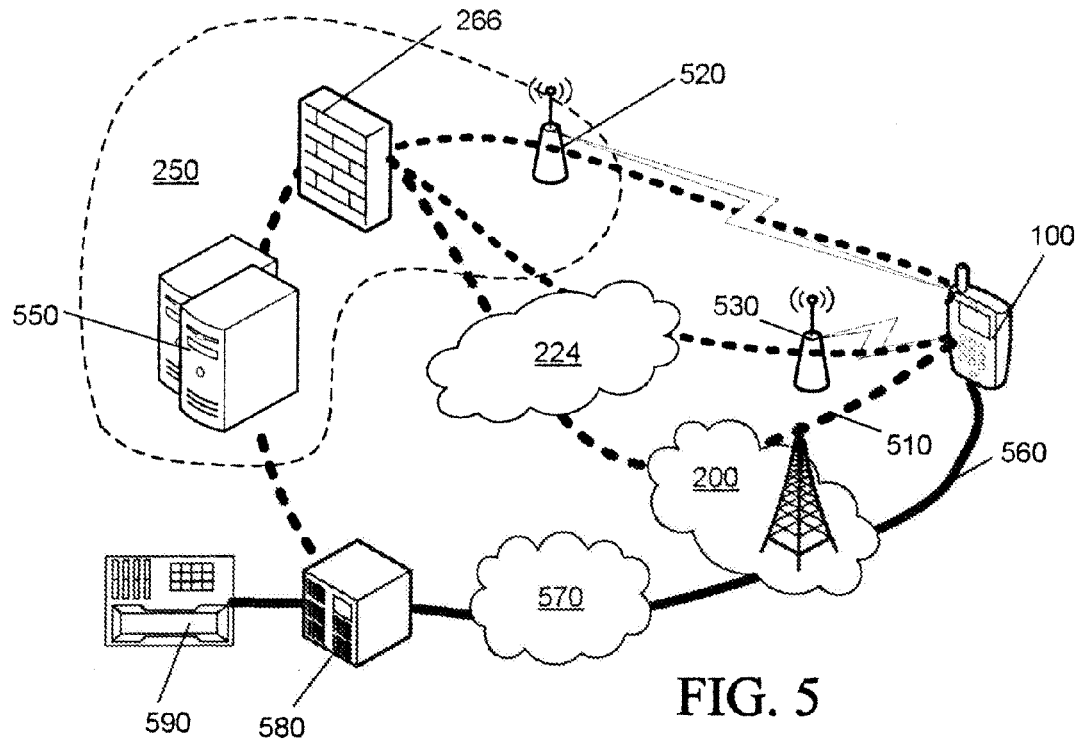
FIG. 5
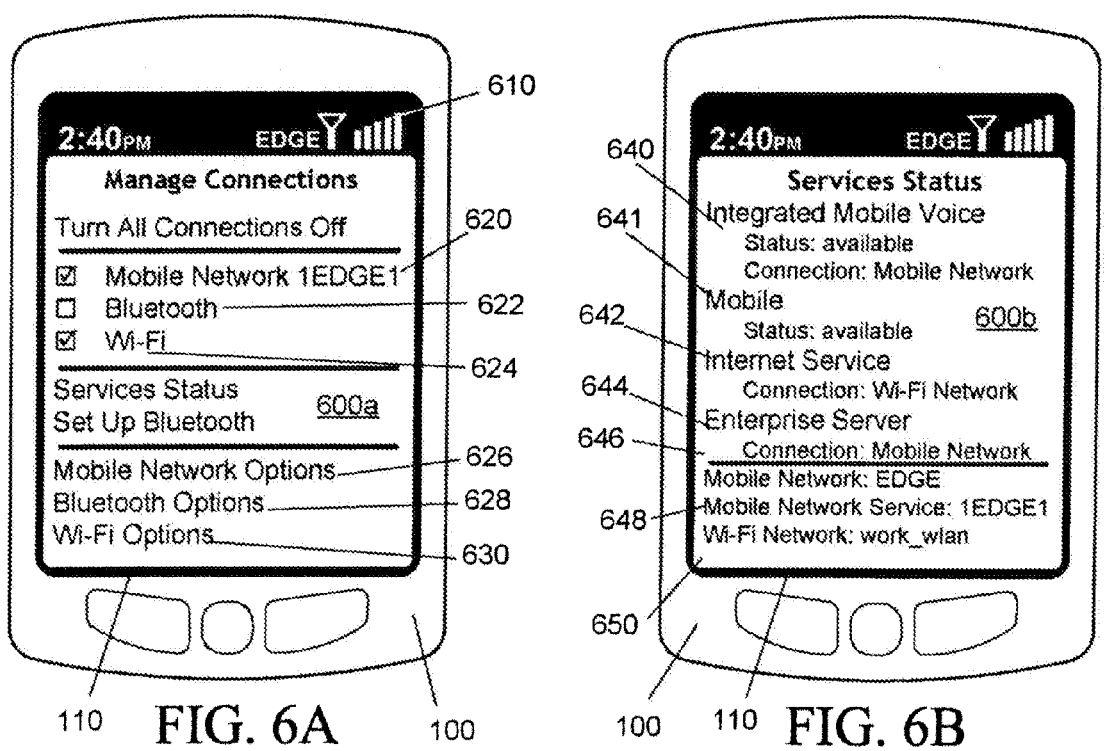
FIG. 6A
FIG. 6B

CONVERSION OF MOBILE DEVICE TO LAN-ONLY TELEPHONY FUNCTIONS

REFERENCE TO PRIOR APPLICATIONS

This application is a continuation of U.S. application Ser. No. 12/843,525, filed Jul. 26, 2010, now issued as U.S. Pat. No. 8,509,186, which claims priority from U.S. Provisional Application No. 61/328,097, filed Apr. 26, 2010, the entireties of which are incorporated by reference.

BACKGROUND

1. Technical Field

The present application relates generally to management of enterprise telephony at a mobile device.

2. Description of the Related Art

Mobile communication devices, such as smartphones, may be used to extend the flexibility of fixed telephone networks within an enterprise. For example, dual-mode smartphones capable of operating over both cellular and IP-based networks may be deployed in an enterprise communication network equipped with a private branch exchange (PBX). The network may then route incoming telephone calls to the smartphone, and outbound calls from the smartphone may appear to the recipient to originate from the user's desk telephone connected to the PBX. The fixed mobile convergence realized by integrating mobile devices into the enterprise's PBX provides for an improved user experience both for the mobile device users and callers, since the system may extend desk phone functionality, such as conference calling, to the mobile device, and also because the mobile device user may appear to be available and "in the office" even when travelling.

Although voice calls made using dual-mode smartphones are typically connected over a cellular network, voice calls may also be completed using Voice over IP (VoIP) protocols over an IP-based network. Thus, for example, if a wireless LAN (LAN) connection is available to the smartphone, telephone calls may be routed over the LAN.

BRIEF DESCRIPTION OF THE DRAWINGS

In drawings which illustrate by way of example only embodiments of the present application.

FIG. 5 is a schematic diagram of a network topology for use with the mobile device of FIG. 1.

FIGS. 6A through 6D are schematic diagrams of graphical user interfaces for the mobile device of FIG. 1.

DETAILED DESCRIPTION

Figure 1:
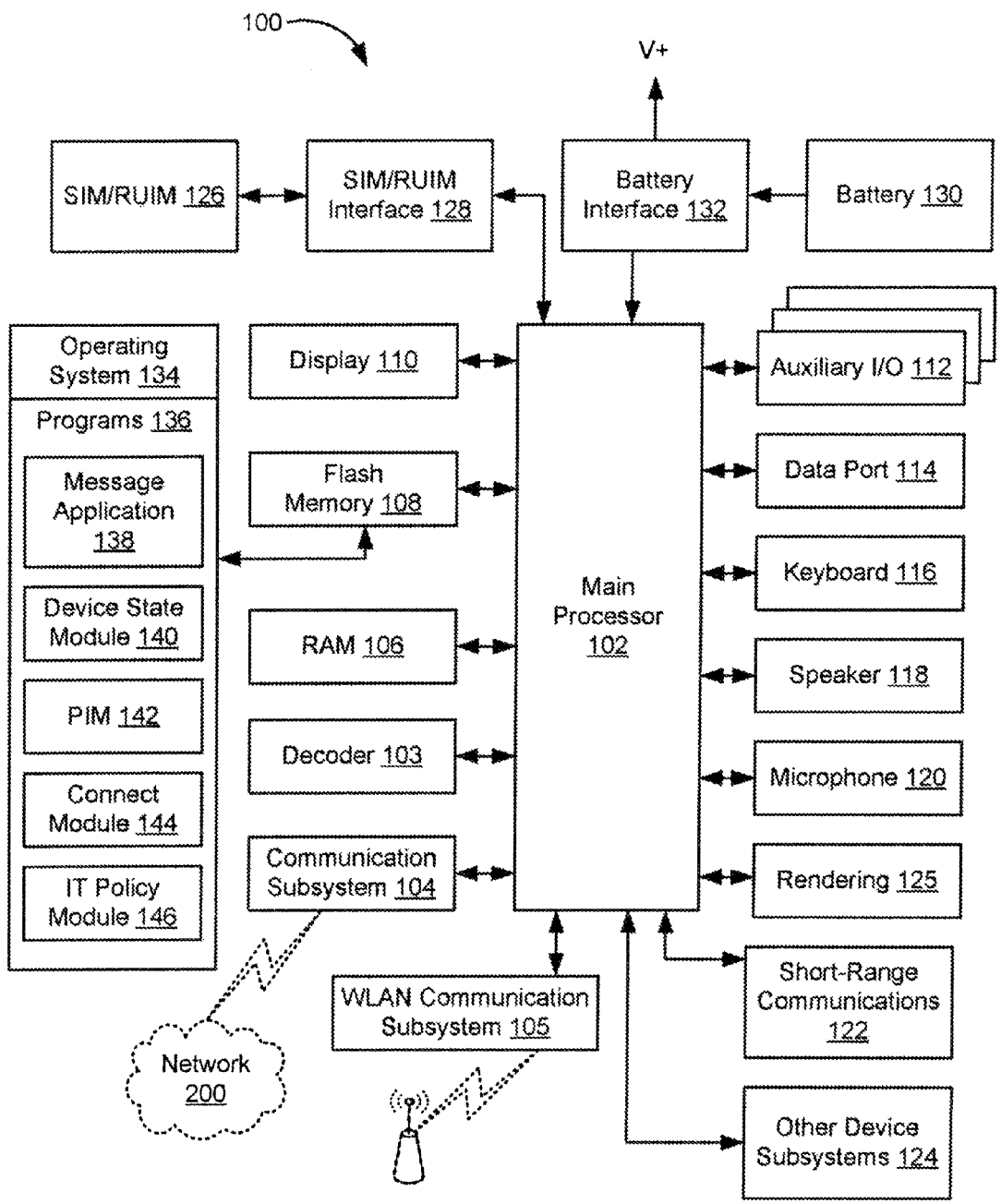
FIG. 1 is a block diagram of an embodiment of a mobile device.

The embodiments described herein provide a system, method, and a mobile device for providing for a convergence of fixed and mobile voice communications in an enterprise environment, while providing a dynamically adjusting user interface responsive to network conditions at the mobile device. There is provided a mobile device configurable for communication over at least one cellular network and over at least on local area network (LAN), the mobile device being adapted for voice communication using at least one mobile telecommunications standard and at least one IP-based network, capable of implementing a method of determining whether the mobile device is configured for communication over a cellular network connection, determining whether the mobile device is configured for communication over a LAN, and in some embodiments a wireless LAN, and adapting a user interface at the mobile device to reflect voice communication availability only over those connections for which the mobile device is determined to be configured. In some aspects, determining whether the mobile device is configured for communication over the cellular network connection may comprise at least one of determining whether a SIM or RUIM card is present in the mobile device, determining whether the mobile device is an activated CDMA device, or determining whether cellular connectivity has been inactivated at the mobile device. Determining whether the mobile device is configured for LAN or wireless LAN communication may comprise determining whether there is an appropriate communications subsystem on board.

Thus, the user interface may therefore be adapted to reflect voice communication availability only over the LAN connection when the mobile device is determined not to be configured for communication over the cellular network but configured for LAN connectivity; voice communication availability only over the cellular network connection when the mobile device is determined to be configured for such communication, but not for communication over the LAN; or if both forms of connectivity are available, the user interface may reflect the availability of voice communication over both.

In these embodiments, availability of voice communication over one or the other path may be indicated by displaying service entry points in the user interface for those available connections, or by displaying a telephone number only for those connections for which the mobile device is configured. In a further aspect of these embodiments, the mobile device may be initially configured for voice communication over the cellular network connection and the LAN connection, but upon detection of a loss of cellular network connectivity, the mobile device may adapt the user interface to reflect voice communication availability only over the LAN connection. In still a further aspect, the mobile device may be adapted to use one set of codecs for voice communication over the cellular network, and may then select a second set of codecs for voice communication over the LAN connection upon detecting the loss of cellular network connectivity. In yet a further aspect, the mobile device may be configured to place and receive voice calls via a PBX over either the cellular network, the LAN connection, or both.

These embodiments will be described primarily in relation to a mobile wireless communication device such as a smartphone, hereafter referred to as a mobile device. It will be appreciated by those skilled in the art, however, that this description is not intended to limit the scope of the described embodiments to smartphones. The methods and systems described herein may be applied to any appropriate communication or data processing device, whether portable or not, including without limitation cellular phones, smartphones, organizers, personal digital assistants, desktop computers, terminals, laptops, tablets, notebook computers and the like.

Figure 2:
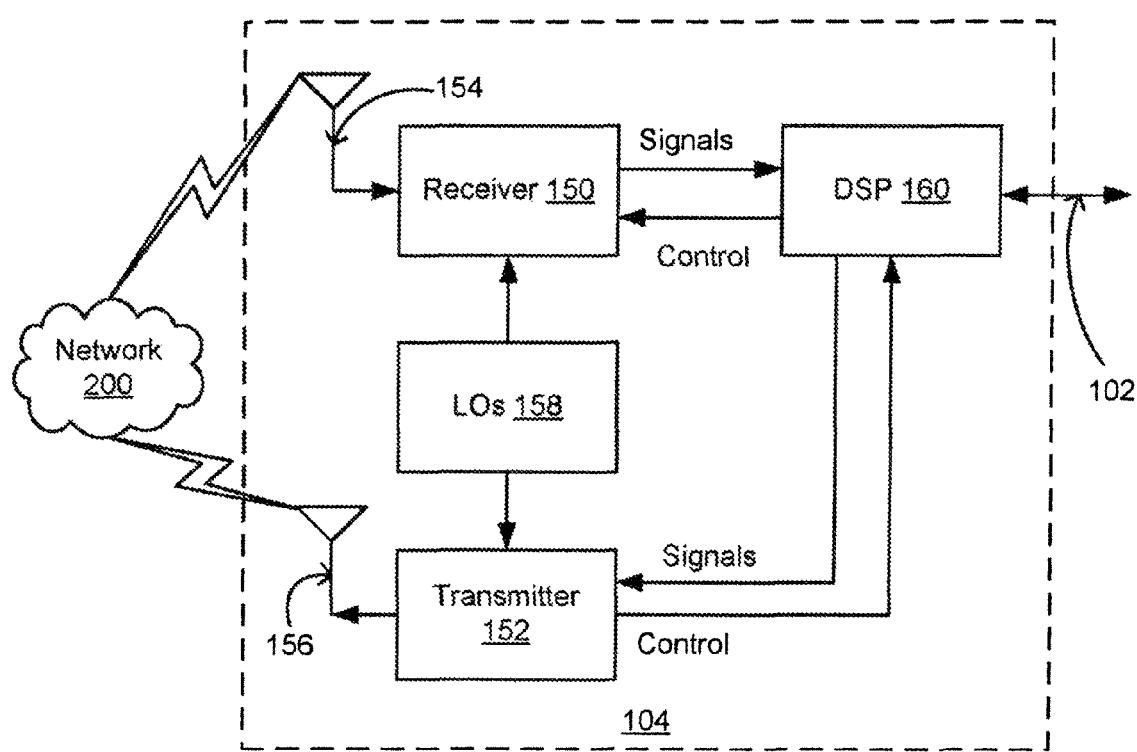
FIG. 2 is a block diagram of an embodiment of a communication subsystem component of the mobile device of FIG. 1.
Figure 3:
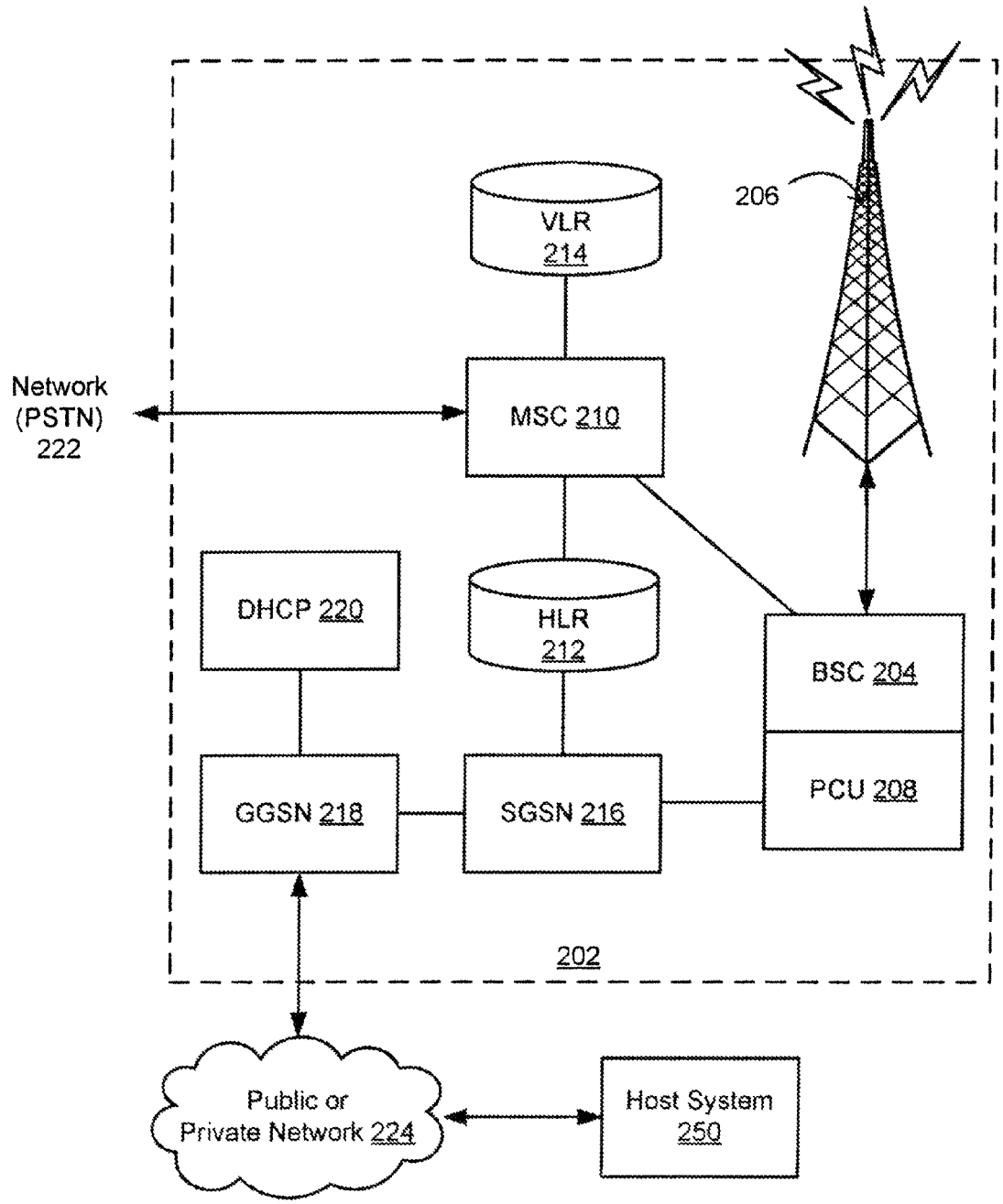
FIG. 3 is an exemplary block diagram of a node of a wireless network for use with the mobile device of FIG. 1.
Figure 4:
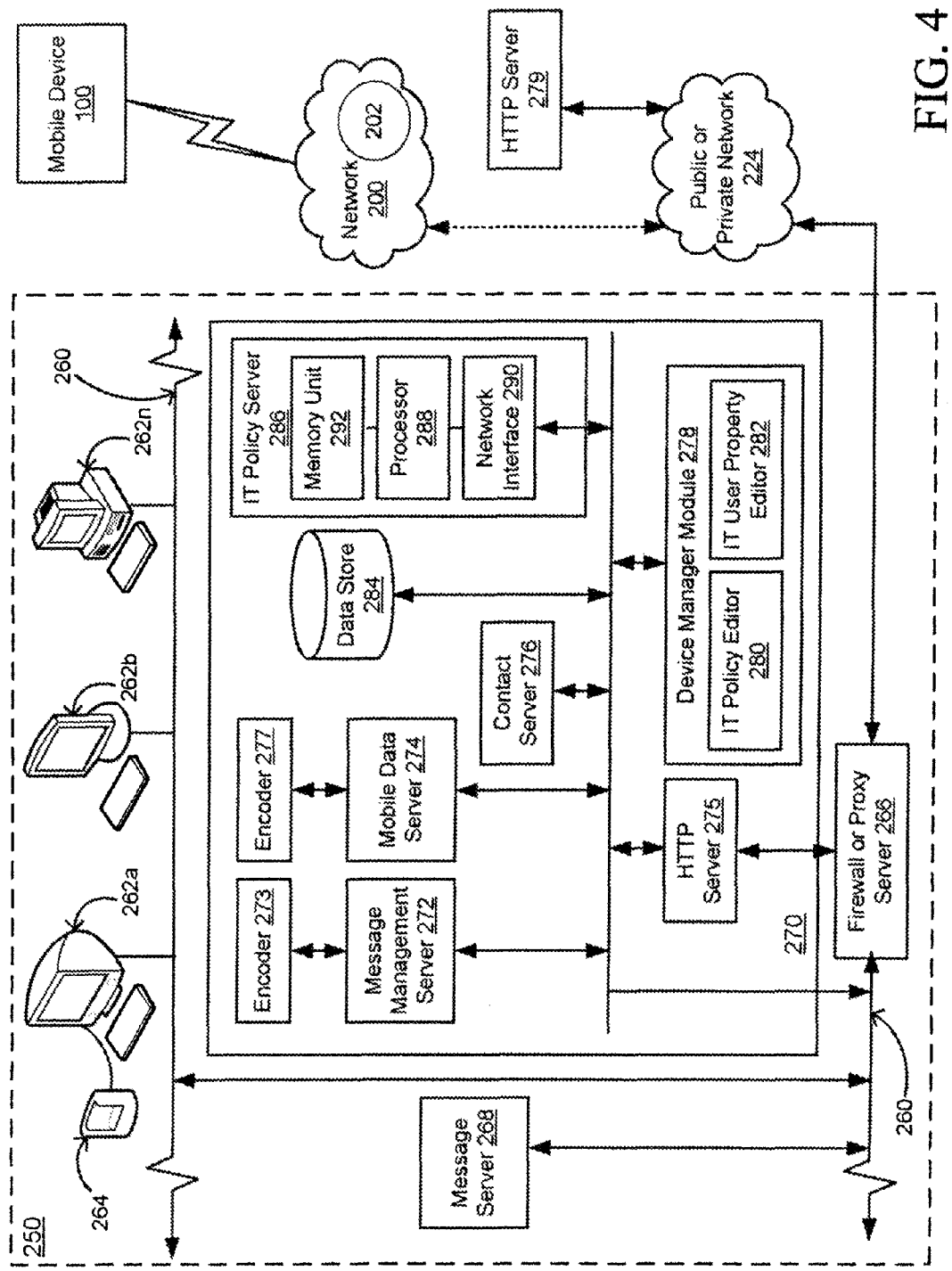
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, the short-range communications 122 and other device subsystems 124.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering circuit 125 may be implemented as hardware, software, or as a combination of both hardware and software.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods. Other communication subsystems, such as the WLAN communication subsystem 105 shown in FIG. 1, may be provided with similar components as those described above configured for communication over the appropriate frequencies and using the appropriate protocols.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's communication device 100 is situated on a LAN connection. The cradle 264 for the communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection may be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262a can request the e-mail messages associated with that user's account stored on the data store associated with the message server 268. These messages are then retrieved from the data store and stored locally on the computer 262a. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as an File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

Rendering data files originally optimized or prepared for visualization on large-screen displays on a portable electronic device display often requires additional processing prior to visualization on the small-screen portable electronic device displays. According to an embodiment, this additional processing is accomplished by the rendering engine 125 shown in FIG. 1. As will be appreciated by those of skill in the art, the rendering engine can be implemented in hardware, software, or a combination thereof, and can comprise a dedicated image processor and associated circuitry, or can be implemented within main processor 102.

As noted above, the mobile device 100 may be a dual-mode or multiple-mode device that is configured to operate in not only voice-centric, but also data-centric networks. For example, the mobile device may be configured to communicate over a dual-mode network such as those identified above, including but not limited to CDMA, CDMA2000, GSM/GPRS, EDGE, EVDO, HSPA, HSPA+, UMTS, and LTE, and may also be configured to communicate over wireless networks that are typically IP-based, such as wireless LANs implementing the Wi-Fi protocol (one or more of the IEEE 802.11 suite of protocols), personal area networks implementing other protocols such as Bluetooth, other wireless networks implementing wireless broadband standards such as WiMAX (one or more of the IEEE 802.16 suite of protocols), and the like. The mobile device may also be configured to operate over a fixed connection to an IP-based network, for example via a USB or Ethernet connection. For ease of reference, these two modes are respectively referred to generally as cellular and LAN modes or networks, where LAN includes both wireless and wired LANs. Although the description herein is generally directed to an implementation on a mobile communication device typically communicating over networks over a wireless link, it will be understood by those skilled in the art that the description is not intended to be so limiting, and includes wired connections. The mobile device 100 may therefore be equipped with multiple interfaces and transceivers for communicating over different fixed and wireless networks, and may be configured to communicate over more than one network at a given time.

Further, the mobile device 100 may capable of operating in a single-line mode and in a multi-line mode. Thus, inbound calls to a plurality of telephone numbers associated with the device 100 may be received at the device 100 when in multi-line mode; and when the device 100 is in the multi-line mode, outbound calls may be placed at the device 100 using a selected one of the telephone numbers associated with the device, so that caller identification delivered to the recipient of the outbound call will identify the call as being placed using that selected telephone number.

Some inbound and outbound calls may be handled through a private branch exchange (PBX) in the same enterprise network environment as the mobile device 100, for example a PBX associated with the host system 250. If the mobile device is configured to communicate with the host system 250 over at least a LAN, the PBX may be configured to connect calls from the mobile device 100 and route calls directed to the device 100 over the LAN. Calls may also be routed through a remotely hosted PBX service assigned to the enterprise, but not necessarily forming a physical part of the enterprise's network. The enterprise's systems may be distributed over significant geographic distances. Hosted telephony services may be used to provide an integrated PBX environment for all users within the enterprise.

FIG. 5 illustrates a possible network topology for the mobile device 100, including two possible paths for data traffic 510 and voice traffic 560. The enterprise environment of the host system 250 may include a PBX 580, provided with connectivity to the public switched telephone network (represented in FIG. 5 by the telephone network cloud 570) over a PRI (primary rate interface) connection. The PBX 580 may be a conventional legacy PBX (i.e., a TDM or time division multiplexing PBX) or an IP PBX based on an IP architecture, or combination thereof. As noted above, the PBX may be a remotely hosted service. Voice communication between the mobile device 100 and the PBX 580 may therefore be routed through the wireless network 200, through the public switched telephone network 570 and wide area network 224, and thence to the PBX 580, and vice versa. Each mobile device 100 to be connected with the PBX 580, as well as any conventional office telephones 590 connected to the PBX 580, may be assigned a DID (direct inward dial) or extension number. In addition, as described previously the mobile device 100 may also communicate via the wireless network 200 and over a wide area network 224 with the host system 250 over a data communication channel, which may be an IP-based channel.

The host system 250 in this embodiment comprises or is associated with the PBX 580 through a server or gateway 550. The server 550 and the PBX 580 may communicate over an IP data channel, for example implementing a SIP (session initiation protocol) circuit. If the PBX 580 is a TDM PBX, then the communication channel may be an ISDN PRI connection, and the server 550 may convert TDM data received from the PBX 580 to IP data. After receiving voice call data from the PBX 580, the server 550 provides the data in a VoIP-compliant format to other components of the host system 250 for re-routing to the mobile device 100 over the data communication channel 510. Thus, calls to or from the mobile device 100 may be routed over an IP network to the PBX 580, allowing the host system 250 to handle authentication of the mobile device 100 and other administrative functions relating to the voice call.

The mobile device 100's access to IP networks and to the public switched telephone network is provided through the wireless network 200, which as described above may comprise one or more nodes 202 configured for communication in accordance a suitable mobile telephony standard. In turn, the wireless network 200 provides the mobile device 100 with connectivity to the Internet or other public wide area network 224, and thence to the host system 250. At the same time, if the mobile device 100 is a multiple-mode device, it may also communicate with the host system 250 over an enterprise LAN, represented by the access point 520. The mobile device 100 may therefore be able to handle calls routed through the PBX 580 not only over the wireless network 200, but also through the LAN 520. This network configuration thus provides the user with a communication service handling both fixed and wireless voice calls. It will also be appreciated by those skilled in the art that access to the host system 250 need not be limited to access via the enterprise LAN network (whether wireless or not). Instead, the mobile device 100 may access the host system 250 over a network, such as the wide area IP network 224, via an access point 530, which may be located at the mobile device user's home, or at a public or private Wi-Fi hotspot.

For some wireless networks 200 or LANs 520, the mobile device 100 may be registered or activated with the respective network. A process for identifying a subscriber to a cellular network using a SIM card 126 is described above. Other methods of registering or identifying the mobile device 100 to various networks will be known to those of ordinary skill in the art. However, registration or activation may not be required for all wireless networks 200, LANs 520 or other access units 530, as some networks may allow access without prior registration or activation. The mobile device 100 may also be provisioned or configured to access the wireless network 200 or LAN 520 or other access point 530. Methods of provisioning services on a mobile device 100 will be generally known to those skilled in the art, but as a non-limiting example, a request for registration may be sent from the mobile device 100 to a registration server of a service (not shown). If the request is approved, the registration server may transmit to the mobile device 100 a service book containing data and instructions to enable the mobile device 100 to provision the service. The service book, when received at the mobile device 100, may be self-executing, and permits the user to enter account information relevant to the associated service. This information is then transmitted from the mobile device 100 to a provisioning server of the service provider (not shown), which may then create a service account associated with the mobile device 100. Provisioning may also be carried out in compliance with the OMA DM (Open Mobile Alliance Device Management) specification version 1.2 or its predecessor or successor versions, published by the Open Mobile Alliance Ltd.

In addition to the provisioning with the service book, additional settings may be established at the device 100 or pushed to the device 100 concerning its access to the wireless network 200, LAN 520, or access point 530. For example, configuration settings may be established disabling one or more modes of communication. If the configuration settings are set to disable cellular communications, the mobile device 100 may be restricted to communication over the LAN 520 only. Such a setting may be desirable in an enterprise environment where security or accounting concerns require that calls be routed through the host system 250 for its authentication and record-keeping functions, or where it is desirable to control costs by disabling cellular communication. The mobile device 100 may be restricted to permit communication over the access point 530 as well in this instance. These additional settings may be stored in a branding or configuration file stored in the memory of the mobile device 100. When the mobile device 100 is initialized, the settings, which may have been established during the provisioning described above, are checked to determine whether the mobile device 100 is permitted to communicate using each provisioned service.

When the mobile device 100 is configured to handle both fixed and mobile voice communications as described above, the device 100 may consequently be converted from a single-line device—a device associated with a single telephone number—to a multiple-line device. The mobile device 100 may be registered with a cellular network service, but at the same time it may be associated with a DID through the PBX 580. Therefore, the device 100 will be reachable through two distinct telephone numbers, and each telephone number will be routed to a different path. In other embodiments, it may be possible to provision the device 100 with more than two telephone numbers.

Accordingly, the mobile device 100 may be configured with a user interface providing the user of the mobile device 100 with access to all lines. Referring to FIG. 6A, a first example of a graphical user interface 600a is shown displayed in the display 110 of a mobile device 100 configured for multiple-line and dual-mode service. The graphical user interface 600a may comprise a banner display, typically positioned across the top of the display 110. This banner display may be used to display current time and date information. In addition, the banner display may feature information about the currently joined network and signal strength 610. In the example of FIG. 6A, the currently joined network is indicated to be an EDGE network.

The particular graphical user interface 600 shown in FIG. 6A is an options screen for managing the connections of the mobile device 100. The graphical user interface 600a features options for turning on or off individual network connections, here indicated as "Mobile Network" 620, representing the cellular network; "Bluetooth" 622; and "Wi-Fi" 624. In this example, both the mobile and Wi-Fi networks 620, 624 are indicated as being on. The graphical user interface 600a also provides menu items to select further options screens for the mobile network 626, Bluetooth 628, and Wi-Fi 630.

Turning to FIG. 6B, a further graphical user interface 600b is shown, displaying the status of services available at the mobile device 100. The graphical user interface 600b lists "Integrated Mobile Voice" 640, representing the fixed mobile convergence feature of receiving and placing calls via the PBX 580 from the mobile device 100, as being "available" and connected through the "Mobile Network", meaning that this voice service is provided via the data communication path 510, through the wireless network 200 shown in FIG. 5. Similarly, the "Mobile" (i.e., cellular) service 641 and the "Enterprise Server" service 644 are indicated as being connected through the "Mobile Network" as well. In this example, however, "Internet Service" 642 is indicated as being connected through the "Wi-Fi Network". This setting may have been established using a configuration setting or in response to an express user instruction to use the Wi-Fi network 520 for Internet service. The graphical user interface 600b also shows current status information regarding the mobile network type 646 and provider 648, and some detail concerning the LAN (in this example, the Wi-Fi network) 650.

Figure 6C:
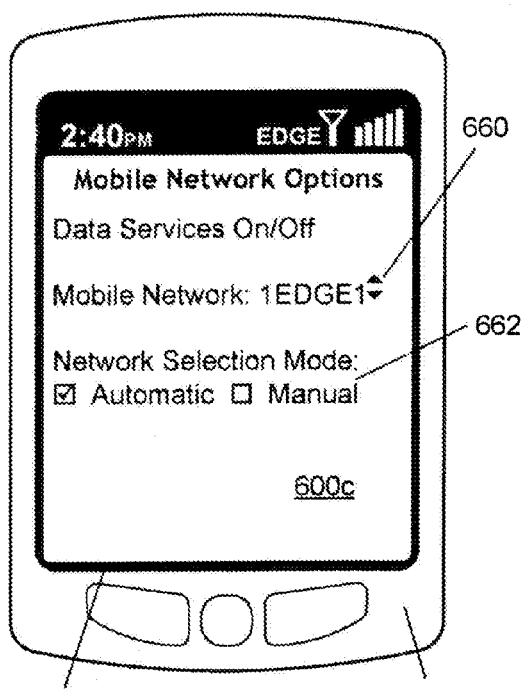
Figure 6D:
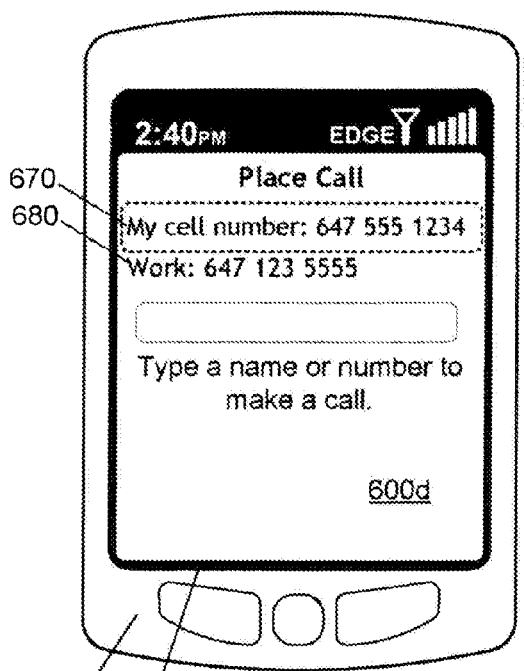

FIG. 6C illustrates a further possible graphical user interface 600c displaying mobile network options for the device 100. In this graphical user interface 600c, the current mobile network is identified at 660, together with a user interface element to select an alternate mobile network if desired. The graphical user interface 600c also includes options for the network selection mode 662, allowing for a selection between "automatic" and "manual", wherein in the "automatic" mode, the device 100 attempts to automatically discover and join any suitable network in range. Finally, FIG. 6D illustrates a graphical user interface 600d in a phone application executing on the device 100. This graphical user interface 600d provides the user with the option of selecting one of two telephone numbers 670, 680 prior to placing a call from the mobile device 100.

However, the configuration of the graphical user interface 600a through 600d is generally selected at the time of the original provisioning of the fixed and mobile voice service on the device, or alternatively when the mobile device 100 is originally provisioned. Yet, network conditions at the mobile device 100 may vary, at least for the reason that the user of the mobile device 100 may on occasion leave the coverage area of one or more of the networks. Thus, while the mobile device 100 may have been originally provisioned as a dual-mode device, it may subsequently lose connectivity to either the LAN 520, access point 530, or the wireless network 200. Or, the mobile device 100 may have been originally provisioned with both cellular and LAN connectivity, but enterprise policy may have changed to forbid use of the mobile device 100 for calls routed outside the host system 250, or the SIM card may have been removed from the mobile device 100. If a loss of connectivity to the wireless network 200 occurs, or if removal of the SIM card or a new configuration setting prevents use of the wireless network, the telephone number associated with the cellular service will be invalid; calls can neither be made from, for received at, that number. However, the graphical user interface will not have changed, and the invalid number will still be displayed to the user in the graphical user interface 600d.

Figure 8:
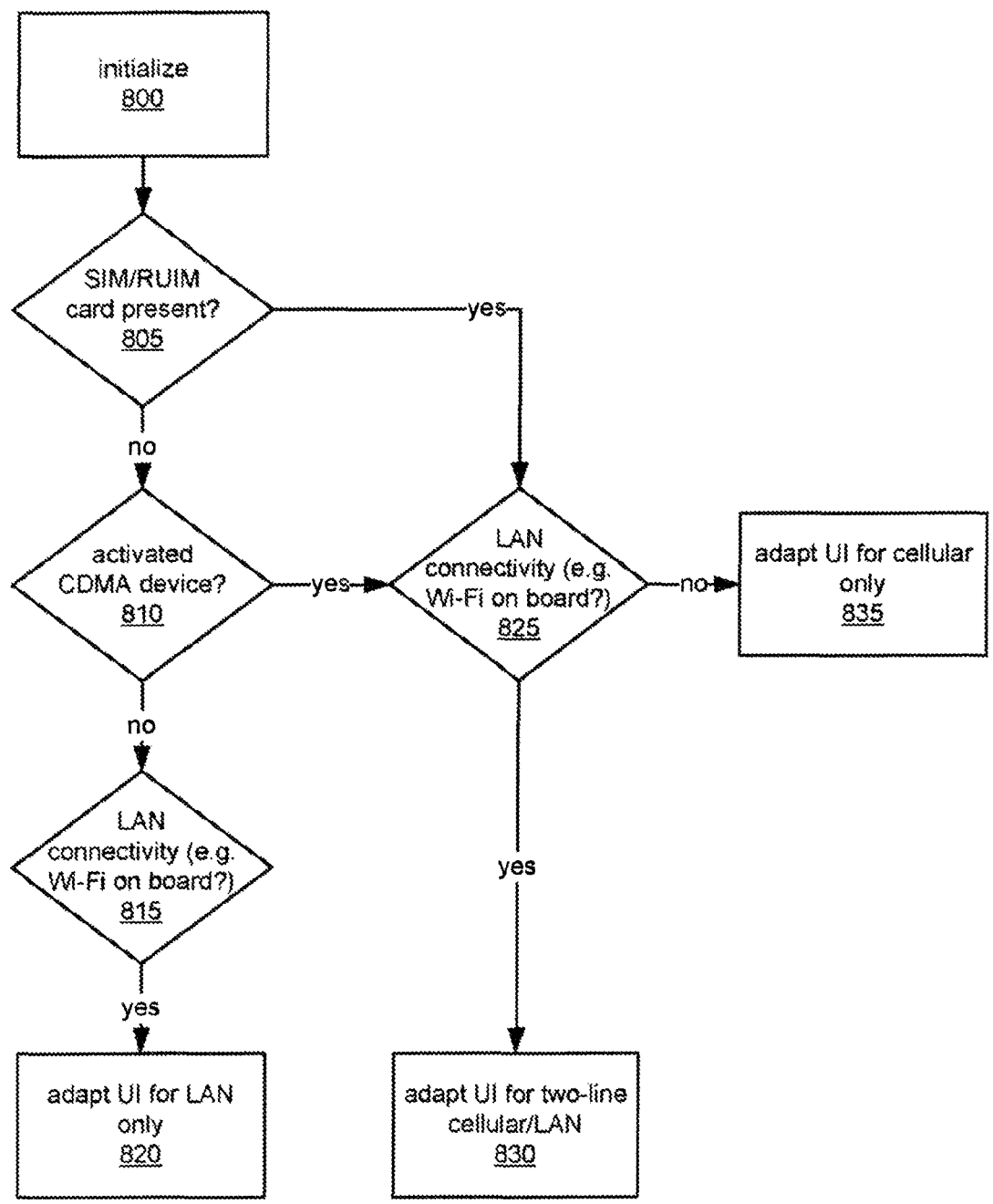
FIG. 8 is a flowchart for a method of adapting the user interface of the mobile device.

Accordingly, a method is provided for reconfiguring the user interface of the mobile device 100 each time an integrated fixed and mobile voice communication system is initiated at the mobile device 100. Referring to FIG. 8, at 800 the system is initialized. At 805, a determination is made whether the SIM or RUIM card 126 is present in the mobile device 100. If it is not present, then control passes to 810, where it is determined whether the mobile device 100 is an activated CDMA device. This may be determined by a review of the configuration settings stored at the device 100. If the device 100 is not an activated CDMA device, then it is determined at 815 whether the device 100 is provided with a LAN connectivity module such as a Wi-Fi transceiver or a wired connection to a LAN.

Figure 7A:
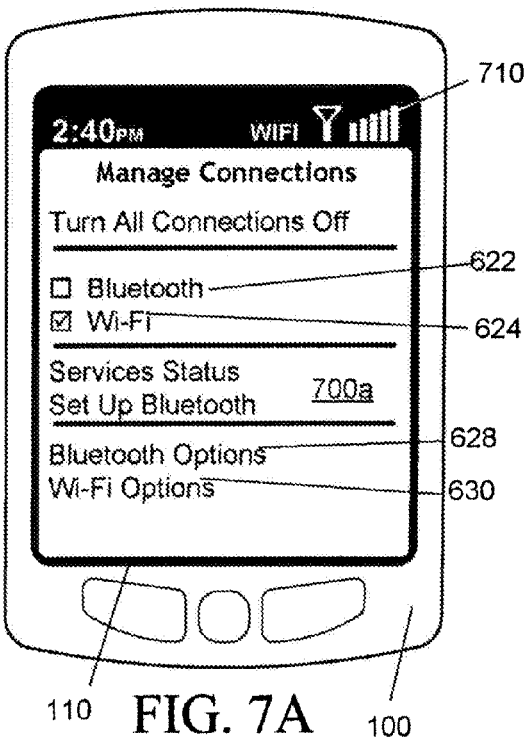
FIGS. 7A through 7D are further diagrams of graphical user interfaces for the mobile device of FIG. 1.
Figure 7B:
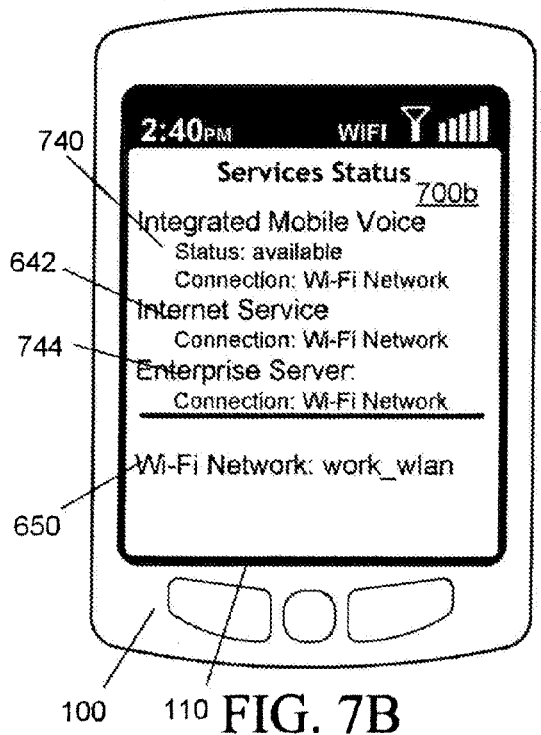
Figure 7C:
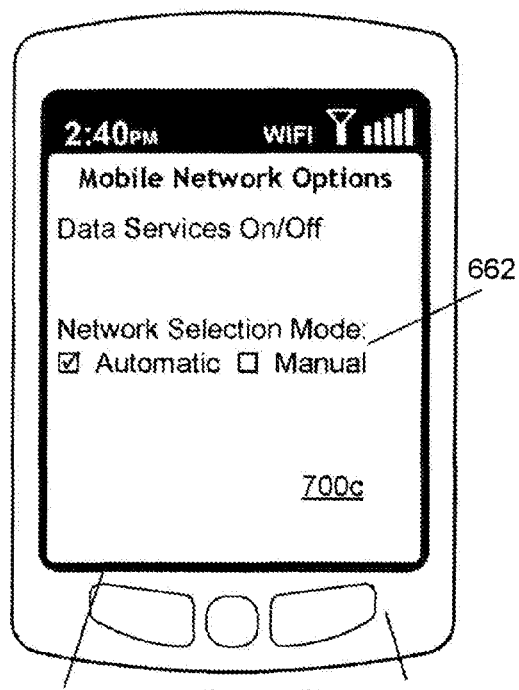

If the device is so provided, then at 820 the user interface is adapted for one-line mode, as shown in FIGS. 7A to 7D. FIG. 7A illustrates a graphical user interface 700a similar to the graphical user interface 600a of FIG. 6A. However, in this embodiment, certain entries are removed from the user interface, as they relate to cellular wireless service, which is not available. Thus, the graphical user interface 700a lists only Bluetooth 622 and Wi-Fi 625 as available network connections, and provides menu options 628, 630 for these connections only. In addition, the network connectivity information 710 displayed in the banner of the graphical user interface 700a indicates that the current service is Wi-Fi. In FIG. 7B, the services status lists "Integrated Mobile Voice" 740 as being available over a Wi-Fi network, rather than over a wireless (cellular) network. The other services, "Internet Service" 642 and "Enterprise Server" 744, are listed as being available over the Wi-Fi network only. In this example, the status of the "Mobile" service 641 shown in FIG. 6B is not indicated at all in the graphical user interface 700b, as cellular service is not currently available in this example. In another embodiment, the graphical user interface 700b may indicate that the "Mobile" service is "unavailable". Thus, the current status information in FIG. 7B reflects the only available network, the Wi-Fi network 650. In FIG. 7C, the mobile network options shown in the graphical user interface 700c are limited only to the selection mode option 662, since the unavailability of cellular service to the mobile device 100 renders the option to choose a network provider moot.

Figure 7D:
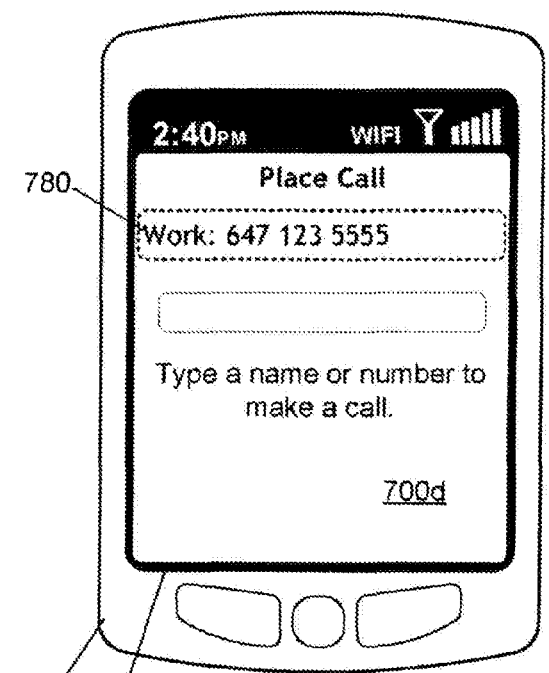

Finally, FIG. 7D illustrates the adapted graphical user interface 700d in the phone application for placing a call. The telephone number relating to the cellular network service, since it is now invalid, is removed from the user interface, leaving the user with sole option of selecting the remaining DID number 780.

Thus, following the branch of the process of FIG. 8 described above results in an adaptation of the user interface to reflect the connectivity available to the mobile device 100. Also following FIG. 8, the device 100 may in some circumstances remain configured with its original graphical user interface. Returning to 805, if it is determined that there is a SIM or RUIM 126 present in the mobile device 100, then it is determined at 825 whether LAN connectivity (in this example, Wi-Fi, although the system may instead determine whether there is LAN connectivity through a different wireless connection or a fixed connection) is provided on board the device 100. If it is not, then the mobile device 100 user interface is adapted to reflect that only the cellular service and the cellular telephone number is available to be used at 835. In some embodiments, the mobile device 100 may still be configured for a two-line mode, since the PBX 580 may be configured to provide connections for both lines to the mobile device 100 over the cellular network. If a LAN connection (e.g., Wi-Fi) is available, then at 830 the mobile device 100's user interface may be adapted to reflect that there remain at least two possible lines to the mobile device 100, so the user interface need not be adapted. Similarly, if at 805 it is determined that there is no SIM/RUIM 126 present, but at 810 it is determined that the mobile device 100 is an activated CDMA device (which does not require a SIM card), at 825 it is then determined whether the device 100 is equipped with LAN connectivity. If it is not, then again the mobile device 100's user interface is adapted to reflect that only cellular service is available. If LAN connectivity is available, then the user interface may be adapted to reflect that there remain at least two possible lines to the mobile device 10. Thus, if cellular service is not available to the mobile device 100, then the mobile device 100's user interface may be adapted so that it appears that the device 100 is a single-line device; but conversely, if cellular service is available to the mobile device 100, in this embodiment the device 100 will be configured for cellular service regardless of the presence or absence of Wi-Fi at the mobile device 100.

Figure 9A:
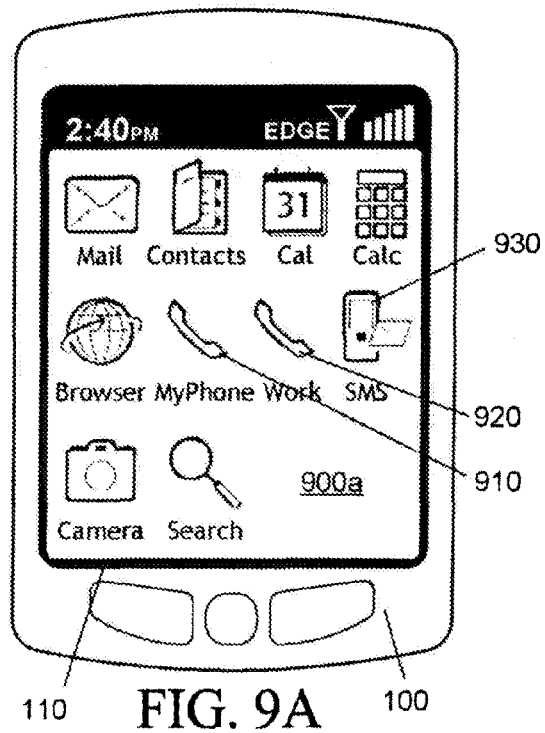
FIGS. 9A and 9B are further examples of graphical user interfaces for the mobile device.
Figure 9B:
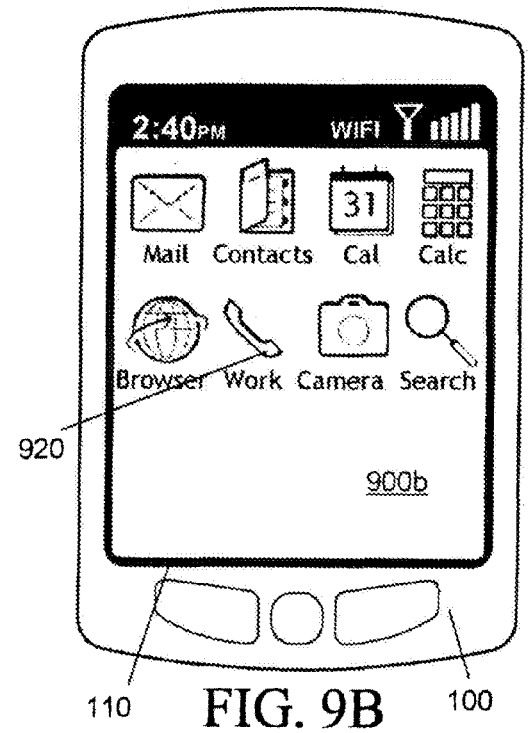

When the user interface is adjusted as described above, further interface elements may be adapted as well. As shown in FIG. 9A, some icons 910, 930 displayed in the "ribbon" or the home screen 900a of the mobile device 100 may represent service entry points for services that require a cellular network connection; another icon 920 may represent another telephony service that is implemented through a LAN connection. Those icons representing services requiring the cellular network connection may be removed as a result of the user interface adjustment described above, as shown in the user interface 900b of FIG. 9B, which illustrates that of icons 910, 920 and 930, only the icon 920, relating to the service implemented through the LAN connection, remains.

Figure 10:
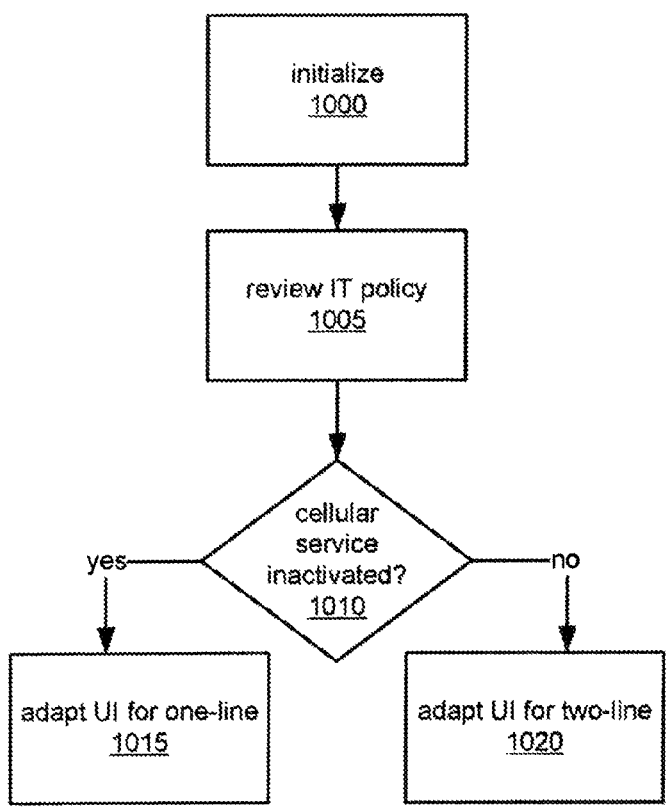
FIG. 10 is a flowchart illustrating a further method for adapting the user interface of the mobile device.

In the foregoing example, the determination of the mobile device 100's availability for CDMA may be determined from the current IT settings or provisioning of the mobile device 100. Further, in the method illustrated in FIG. 8, the determination whether the mobile device 100 user interface was to be adapted for single-line mode was premised not only on the current IT settings or provisioning of the mobile device, but also on whether the device 100 was provided with a SIM/RUIM 126. However, the user of the mobile device 100 may provide their own SIM/RUIM 126, although use of the phone on the cellular network may be prohibited by the enterprise's internal policies. Therefore, as shown in FIG. 10 in a further embodiment, after initialization 1000 of the integrated fixed and mobile voice communication feature on the mobile device 100, any relevant IT policy at the device is reviewed at 1005. If, as a result of the IT policy, it is determined at 1010 that cellular service is to be inactivated, then at 1015 the user interface of the mobile device 100 is adapted to provide options for a single line, the DID line available through the LAN, only. If it is determined that cellular service is not to be inactivated, then at 1020 the user interface is adapted for two-line communication.

Figure 11:
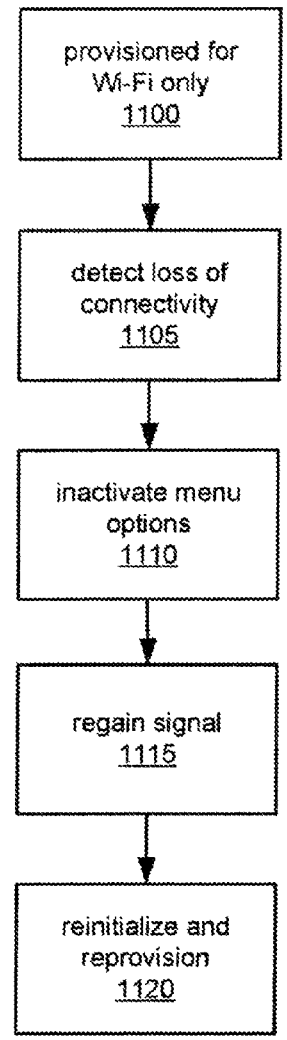
FIG. 11 is a flowchart illustrating a method for handling a detected loss of connectivity.

In a further embodiment, referring to FIG. 11, the mobile device 100 may have been provisioned for Wi-Fi or LAN connectivity only at 1100, and cellular network connectivity may have been disabled. This configuration may have been fixed at the time the mobile device 100 was deployed in the enterprise network. In this embodiment, the mobile device 100 will enjoy LAN connectivity to the host system 250 only so long as it is within the coverage area of the enterprise's LAN 520 (and similarly, if the device is provisioned or configured for access to the home system 250 via the access point 530, it will enjoy connectivity to the host system 250 provided it is in the coverage area of the access point 530). However, if the user moves out of range or there is otherwise a loss of connectivity detected 1105, at 1110 the user interface automatically deactivates the menu options associated with the device 100. In this embodiment, the user interface items may be merely greyed out, or may be removed altogether, similar to FIGS. 7A through 7D. When the mobile device 100 regains the LAN signal at 1115, it may reconnect with the host system 250 and advise of its return to the network, and then reinitialize its integrated fixed and mobile voice communication system and attempt to re-provision itself, downloading any new IT policies or other settings, at 1120.

Figures 12, 13:
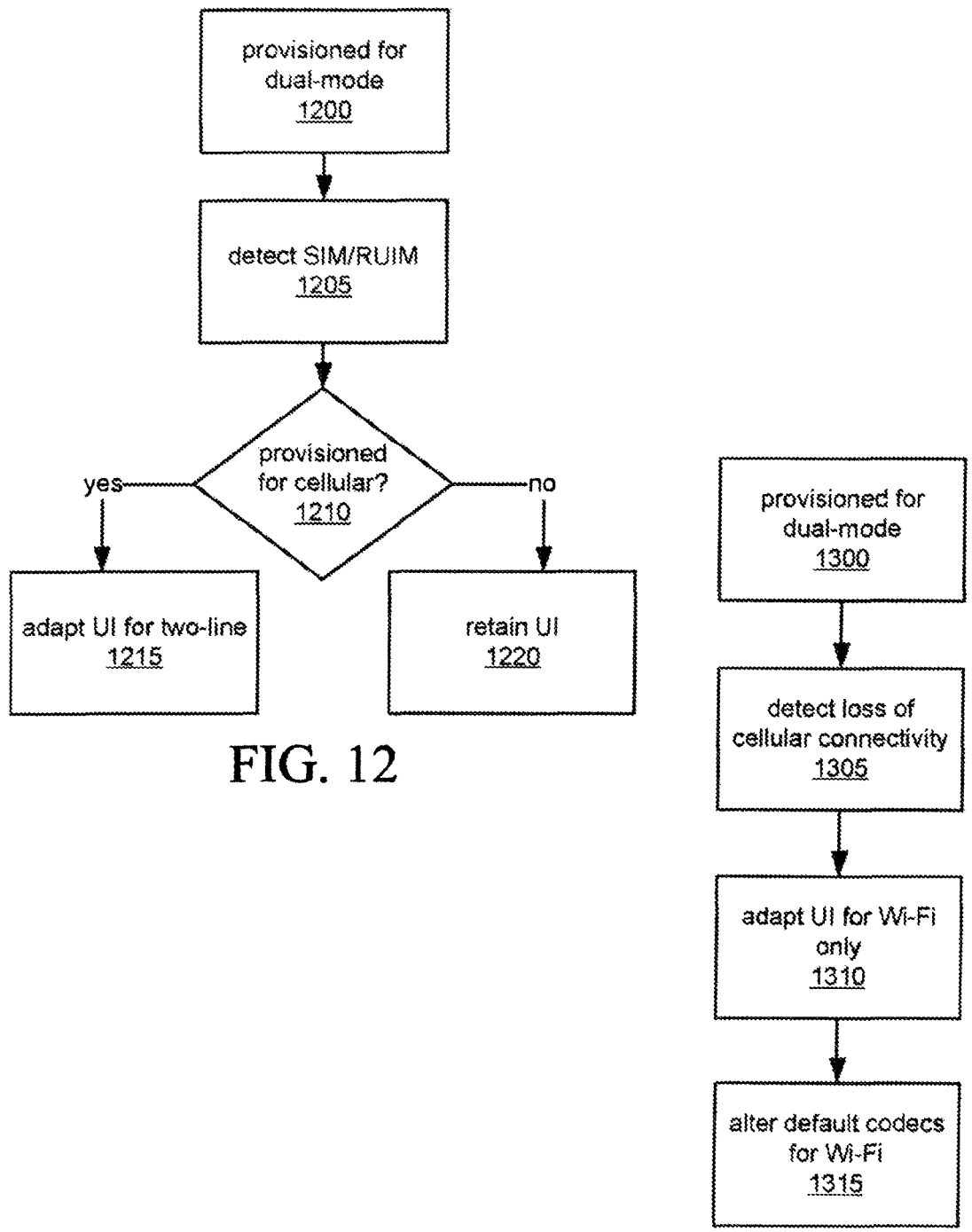
FIG. 12 is a flowchart illustrating a further method for adapting the user interface of the mobile device.
FIG. 13 is a flowchart illustrating a method for adapting the default codecs at the mobile device.

In still a further embodiment, the mobile device 100 may have been provisioned for dual-mode communications as shown at 1200 of FIG. 12, but may have been lacking the SIM or other registration information to be able to communicate over the cellular network. Accordingly, a first user interface displayed by the mobile device 100 may not include an option to select calling functions using the cellular network. As a next step, any SIM/RUIM in the device 100 is detected at 1205. Next, it is determined at 1210 whether the device is provisioned with cellular functionality as well. If it is, then the user interface is adapted by the mobile device 100 for a multi-line telephone mode including cellular communications at 1215; if the device 100 is not so provisioned, then the first user interface is retained at 1220. In a further embodiment, the mobile device 100 may be configured to receive a second SIM card in addition to the first, so if the new SIM card is detected at 1215 and the mobile device 100 is provisioned for cellular communication, at 1215 the user interface may be adapted for multi-line telephone mode including communication over the cellular network using the additional SIM card.

Finally, with respect to FIG. 13, after the mobile device 100 has been provisioned for both cellular and LAN communication at 1300, a loss of cellular connectivity may be detected at 1305. At 1310, the mobile device 100 may adapt the user interface to display only Wi-Fi or LAN-related options as described above. In addition, at 1315, the device 100 alters its default codec settings stored in its memory. It will be appreciated by those skilled in the art that when a connection is made between the mobile device 100 and another device in the enterprise network, the device 100 and the other device negotiate the selection of the voice codec to be used for the particular network type and quality of the connection. The mobile device 100 may store a list of available codecs with which it can negotiate. However, the set of suitable codecs for use over the cellular network may be different from those that are suitable for use with another network, such as a Wi-Fi network. Therefore, in this embodiment, a first set of codecs may be identified in a first profile setting for use with a first cellular network; however, once it is detected that cellular connectivity has been lost, it is presumed that future voice communication will be routed through the LAN, so at 1315 the mobile device 100 may retrieve a further set of codecs identified in a second profile setting for use with the LAN. This further set of codecs may then be used to negotiate a new voice connection with the other device.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method implemented by a mobile device, the method comprising:
    determining whether the mobile device is configured for voice communication over a cellular network connection or over an IP-based network;
    displaying, on a graphical user interface, a first indication of outbound voice communication availability in association with a corresponding cellular telephone number when the mobile device is configured for voice communication over a cellular network connection, the first indication including a presentation of the cellular telephone number;
    displaying, on the graphical user interface, a second indication of outbound voice communication availability in association with a corresponding direct inward dial number when the mobile device is configured for voice communication over an IP-based network, the second indication including a presentation of the direct inward dial number; and
    upon determining that the mobile device has lost connectivity over the cellular network connection or the IP-based network:
        when the mobile device is still configured for voice communication over the cellular network connection and the IP-based network, automatically greying out the indication of outbound voice communication availability in association with the corresponding cellular telephone number or direct inward dial number; and
        when the mobile device is no longer configured for voice communication over the cellular network connection or the IP-based network, removing the indication of outbound voice communication availability in association with the corresponding cellular telephone number or direct inward dial number.

2. The method of claim 1, wherein the mobile device is configured for voice communication over both the cellular network connection and the IP-based network.

3. The method of claim 1, wherein the direct inward dial number is associated with a PBX, the method further comprising displaying, on the graphical user interface, an indication of outbound voice communication availability in association with the corresponding direct inward dial number when the mobile device is configured for communication over the cellular network connection and connectivity with the PBX is available over the cellular network connection.

4. The method of claim 3, wherein the mobile device is configured for voice communication over both the cellular network connection and the IP-based network and connectivity with the PBX is available over the cellular network connection.

5. The method of claim 1, wherein the indications of outbound voice communication availability comprise icons selectable to invoke service entry points for telephony services associated with the corresponding cellular telephone number or direct inward dial number.

6. The method of claim 1, further comprising determining whether the mobile device is configured for voice communication over the cellular network connection by either:
    determining whether a SIM or RUIM card is present in the mobile device; or
    determining whether the mobile device is an activated CDMA device.

7. The method of claim 1, wherein the mobile device is not configured for voice communication over the cellular network connection when connectivity over the cellular network connection has been inactivated by a policy setting stored at the mobile device.

8. A mobile device, including:
    a display;
    a wireless communications subsystem for communicating over a cellular network connection;
    a wireless communications subsystem for communicating over an IP-based network; and
    a processor configured to:
        determine whether the mobile device is configured for voice communication over a cellular network connection or over an IP-based network;
        enable displaying, by the display on a graphical user interface, a first indication of outbound voice communication availability in association with a corresponding cellular telephone number when the mobile device is configured for voice communication over a cellular network connection, the first indication including a presentation of the cellular telephone number;

enable displaying, by the display on the graphical user interface, a second indication of outbound voice communication availability in association with a corresponding direct inward dial number when the mobile device is configured for voice communication over an IP-based network, the second indication including a presentation of the direct inward dial number; and upon determining that the mobile device has lost connectivity over the cellular network connection or the IP-based network:

when the mobile device is still configured for voice communication over the cellular network connection and the IP-based network, automatically greying out the indication of outbound voice communication availability in association with the corresponding cellular telephone number or direct inward dial number; and when the mobile device is no longer configured for voice communication over the cellular network connection and the IP-based network, removing the indication of outbound voice communication availability in association with the corresponding cellular telephone number or direct inward dial number.

9. The mobile device of claim 8, wherein the mobile device is configured for voice communication over both the cellular network connection and the IP-based network.

10. The mobile device of claim 8, wherein the direct inward dial number is associated with a PBX, and the processor is further configured to enable displaying, on the graphical user interface, an indication of outbound voice communication availability in association with the corresponding direct inward dial number when the mobile device is configured for communication over the cellular network connection and connectivity with the PBX is available over the cellular network connection.

11. The mobile device of claim 10, wherein the mobile device is configured for voice communication over both the cellular network connection and the IP-based network and connectivity with the PBX is available over the cellular network connection.

12. The mobile device of claim 8, wherein the indications of outbound voice communication availability comprise icons selectable to invoke service entry points for telephony services associated with the corresponding cellular telephone number or direct inward dial number.

13. The mobile device of claim 8, wherein the processor is further configured to enable determining whether the mobile device is configured for voice communication over the cellular network connection by either:

determining whether a SIM or RUIM card is present in the mobile device; or determining whether the mobile device is an activated CDMA device.

14. The mobile device of claim 8, wherein the mobile device is not configured for voice communication over the cellular network connection when connectivity over the cellular network connection has been inactivated by a policy setting stored at the mobile device.

* * * * *